3,201,377
REACTION PRODUCT OF A RUBBER AND A POLYNITRILE DECABORANE
Joseph Green, Dover, Marvin M. Fein, Westfield, and Michael Israel, Morristown, N.J., assignors to Thiokol Chemical Corporation, Bristol, Pa., a corporation of Delaware
No Drawing. Filed Sept. 29, 1960, Ser. No. 59,458
12 Claims. (Cl. 260—85.3)

This invention relates to reaction products of various olefinic rubbers with nitrileboranes.

It has now been found that certain nitrileboranes can be combined with various rubbers, synthetic and natural, to form a solid material of high boron content suitable for use as a propellant fuel for rocket power plants and other jet propelled devices.

The fuels of this invention when incorporated with suitable oxidizers, such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse. Appreciable increases in performance will result from the use of the higher specific impulse materials. The fuels of this invention when incorporated with oxidizers are capable of being formed into a wide variety of grains, tablets and shapes all with desirable mechanical and chemical properties. Propellants produced by the methods described in this application burn uniformly without disintegration when ignited by conventional means, such as the pyrotechnic type igniter and are mechanically strong enough to withstand ordinary handling.

According to this invention it was discovered that polynitrile decaboranes or polynitrile alkyldecaboranes will react with olefinic rubbers.

Polynitrile decaboranes can be prepared by the method described in copending application Serial No. 690,407, filed October 15, 1957 of Murray S. Cohen et al. Suitable polynitrile decaboranes disclosed in that application include those prepared by reacting 0.01 to 14 moles of a dicyano alkane having from 1 to 6 carbon atoms per mole of decaborane at a temperature of 0° to 180° C.

Polynitrile alkyldecaboranes can be prepared by the method described in copending application Serial No. 772,631, filed November 7, 1958 of George J. Donovan et al. and now abandoned. This application discloses the preparation of solid reaction products of a lower alkyldecaborane and a dicyano alkane by reacting a dicyano alkane from 2 to 6 carbon atoms with from 0.1 to 10 moles of a lower alkyl decaborane per mole of dicyano alkane at a temperature within the range from about 50° to 150° C.

The olefinic rubbers useful in this invention include liquid rubbers, solid rubbers and solid rubbers plasticized to a liquid state and include natural rubber and various synthetic rubbers, for example, liquid depolymerized natural rubber (DPR), butadiene-styrene copolymers (GR–S), butadiene-acrylonitrile copolymers (nitrile rubbers), butadiene-acrylic acid copolymers, polybutadiene, and isobutylene-isoprene copolymers (butyl rubbers). By the term "a rubber" it is meant to include such compositions. These olefinic rubbers are well known and are described at length in copending application Serial No. 749,558, filed July 18, 1958, of Jack D. Breazeale et al.

The ratio of reactants can be varied widely, generally being in the range of 0.1 to 10 moles of polynitrile decaborane or polynitrile alkyldecaborane per mole of rubber and preferably in the range of 0.5 to 2 moles of borane per mole of rubber. The reaction temperatures can vary widely, generally being from 25° to 200° C., preferably from 25° to 100° C. The reaction pressure can vary from subatmospheric to several atmospheres, although atmospheric pressure reactions are convenient. The reaction generally requires about 1 to 24 hours, depending upon the ratio of reactants, the particular reactants and solvents employed, and the temperature and pressure of the reaction.

Although the reaction will proceed in the absence of a solvent, best results are obtained, especially where solid reactants are employed, by carrying out the reaction in a solvent inert with respect to the reactants. Such solvents include aliphatic hydrocarbon solvents, such as n-pentane, hexane and heptane, aromatic hydrocarbon solvents such as benzene, toluene and xylene, cycloaliphatic solvents such as cyclohexane and methylcyclopentane and oxygenated organic solvents such as dioxane, ethyl acetate, and diisopropyl ether. The amount of solvent can vary widely but generally ranges up to about 70 times the weight of the reactants. When a solvent is employed, it is preferred to carry out the reaction at the reflux temperature of the solvent.

The process of this invention is illustrated in detail by the following examples.

*Example I*

The polynitrile decaborane employed in this experiment was prepared by reacting 1 mole of adiponitrile with 0.1 mole of decaborane in 180 milliliters of benzene at reflux temperature for 50 hours. The polymeric nitrileborane precipitated out of solution and was isolated by filtration. It was a white powder stable above 290° C.

8.0 grams of the above product were milled into 8.0 grams of Enjay Butyl 325, a solid butyl rubber which is a copolymer of isobutylene and isoprene having about 2.5 mole percent unsaturation, on a standard laboratory rubber mill. The product was cured in a 2" by 2" by 0.075" rubber mold for 60 minutes at 300° F. A highly resilient rubber was obtained which had a durometer of 52 on the Shore A scale.

*Example II*

5 grams of the adiponitrile-decaborane reaction product prepared as described in Example I and 5 grams of liquid depolymerized natural rubber were mixed in a Baker-Perkins mixer. The mixture was heated several hours at 100° C. to yield a cured product.

*Example III*

0.75 gram of smoked sheet (natural rubber) was banded on a 1.25" by 4" rubber mill and 1.25 grams of the adiponitrile-decaborane reaction product prepared as described in Example I were slowly incorporated into the rubber. This resulted in a stiffening of the rubber greater than that anticipated from the use of usual rubber fillers. The product contained 28% boron.

The boron containing solid materials produced by practicing the methods of this invention, can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 5 to 35 parts by weight of boron containing material and from 65 to 95 parts by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin generally of the urea-formaldehyde or phenol-formaldehyde type, the function of the resin being to give the propellent mechanical strength and at the same time improve its burning characteristics. Thus, in manufacturing a suitable propellant, proper proportions of finely divided oxidizer and finely divided boron containing material can be admixed with a high solids content solution of partially condensed urea-formaldehyde or phenol-formaldehyde resin, the proportions being such that the amount of resin is about 5 to 10 percent by weight based on the weight of oxidizer and boron compound. The ingredients are thoroughly mixed with the simultaneous removal of solvent, and following this the solvent free mixture is molded into the desired shape, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

We claim:

1. A method for the production of an organoboron compound useful as a fuel which comprises reacting a borane selected from the group consisting of polynitrile decaboranes and polynitrile alkyldecaboranes with a material consisting essentially of an olefinic rubber, the polynitrile decaboranes being the reaction products of decaborane with a decyano unsubstituted alkane having from 1 to 12 carbon atoms, and the polynitrile alkyldecaboranes being the reaction products of a lower alkyl decaborane with a dicyano unsubstituted alkane having from 1 to 6 carbon atoms.

2. The method of claim 1 wherein the borane is polyadiponitrile decaborane.

3. The method of claim 1 wherein the olefinic rubber is an isobutylene isoprene copolymer.

4. The method of claim 1 wherein the olefinic rubber is liquid depolymerized natural rubber.

5. The method of claim 1 wherein the olefinic rubber is smoked sheet natural rubber.

6. The method of claim 1 wherein the borane is polyadiponitrile decaborane and the olefinic rubber is an isobutylene-isoprene copolymer.

7. The method of claim 1 wherein the borane is polyadiponitrile decaborane and the olefinic rubber is liquid depolymerized natural rubber.

8. The method of claim 1 wherein the borane is polyadiponitrile decaborane and the olefinic rubber is smoked sheet natural rubber.

9. The products produced by the method of claim 1.
10. The products produced by the method of claim 6.
11. The products produced by the method of claim 7.
12. The products produced by the method of claim 8.

No references cited.

MURRAY TILLMAN, *Primary Examiner.*

LEON D. ROSDOL, CARL D. QUARFORTH,
*Examiners.*